US010990639B2

(12) United States Patent
Kumar et al.

(10) Patent No.: US 10,990,639 B2
(45) Date of Patent: Apr. 27, 2021

(54) SEARCH TECHNIQUES USING CONTEXT

(71) Applicant: SAP SE, Walldorf (DE)

(72) Inventors: Mukesh Kumar, Bangalore (IN); Gaurav Kumar, Madhepura Bihar (IN); Srinivasa Raghavan V, Chennai (IN)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/228,907

(22) Filed: Dec. 21, 2018

(65) Prior Publication Data
US 2020/0125620 A1    Apr. 23, 2020

(30) Foreign Application Priority Data
Oct. 18, 2018   (IN) .............................. 201811039473

(51) Int. Cl.
*G06F 17/00* (2019.01)
*G06F 16/9538* (2019.01)
*G06F 16/954* (2019.01)
*G06F 16/9535* (2019.01)
*G06F 9/451* (2018.01)

(52) U.S. Cl.
CPC .......... *G06F 16/9538* (2019.01); *G06F 9/453* (2018.02); *G06F 16/954* (2019.01); *G06F 16/9535* (2019.01)

(58) Field of Classification Search
CPC ............... G06F 16/9538; G06F 16/954; G06F 16/9535; G06F 16/955; G06F 9/453
See application file for complete search history.

(56) References Cited

U.S. PATENT DOCUMENTS

| | | | |
|---|---|---|---|
| 6,259,445 B1 * | 7/2001 | Hennum | G06F 9/453 |
| | | | 715/709 |
| 8,296,311 B2 | 10/2012 | Rapp et al. | |
| 8,914,347 B2 | 12/2014 | Stienhans | |
| 8,943,045 B2 | 1/2015 | Murthy | |
| 9,619,528 B2 | 4/2017 | Riley et al. | |
| 2012/0173565 A1 * | 7/2012 | Jacobs | G06F 16/954 |
| | | | 707/769 |
| 2013/0311459 A1 | 11/2013 | Koide et al. | |

OTHER PUBLICATIONS

Tom Yeh, Tsung-Hsiang Chang, Bo Xie, Greg Walsh, Ivan Watkins, Krist Wongsuphasawat, Man Huang, Larry S. Davis, and Benjamin B. Bederson, Creating contextual help for GUIs using screenshots, In Proceedings of the 24th annual ACM symposium on User interface software and technology, pp. 145-154, Oct. 2011.*

(Continued)

*Primary Examiner* — Greta L Robinson
(74) *Attorney, Agent, or Firm* — Fish & Richardson P.C.

(57) ABSTRACT

Computer-implemented systems and computer-implemented methods include the following. A request is received to perform a search for solutions corresponding to a topic. The request includes the topic and a context associated with the topic for which solutions are to be searched. The context is associated with a current state of an application in use by a user. The search is performed using the context and the topic. Results of the search are provided for presentation to the user. The results are presented in an application of the application without requiring the user to exit the application.

20 Claims, 12 Drawing Sheets

(56) References Cited

OTHER PUBLICATIONS

Ashwin Ramachandran and R. Michael Young, Providing intelligent help across applications in dynamic user and environment contexts, In Proceedings of the 10th international conference on Intelligent user interfaces (IUI '05), Association for Computing Machinery, pp. 269-271, Jan. 2005.*

Reid, Sam; "*Swiftype API overview: Customize your search engine*"; Pub. Nov. 7, 2017 @ https://blog.swiftype.com ; 3 pages.

* cited by examiner

1 Search for Solution > 2 Enter Incident Information > 3 Add Attachments > 4 Confirmation — 202a, 202b, 202c, 202d < Previous | Next > | Finish | Cancel You can use the links below to search for a solution to your problem

- Support Page for ByDesign
  Here you find important support fundamentals for Business ByDesign.
- Feature/Idea Request
  If you have a feature request, you should directly address it to Product Mana...
- Community Network
  Access the knowledge of a fast-growing worldwide user community where all...
- Implementation Partner Offering
  When it comes to questions related to your specific implementation, your imp...
- Extensibility, Integration or Mitigation Services
  If you require extensibility, integration or mitigation services for your cloud sol...
- Information required from you
  Support needs certain information from you to be able to answer your q...

Solution Proposals
If you enter keywords in a language other than English and you receive too few hits, you can repeat your search using English keywords to increase the chance of receiving a larger number of hits.

| All Solutions ∨ | Group By | Repository Type ∨ | ~210 | Buyer responsible m ⊕ 🔍 | ▽ |
|---|---|---|---|---|---|
| ID ~204 | | Title ~206a | | | Repository Type |

~206 { ~206b

> Repository Type: Built-In Help (20) ~212
> Repository Type: Google® Search (10) ~212

~208
| | | |
|---|---|---|
| 1918591 - Error Message : "Buyer responsible missing" Occurs ... | Google® Search |
| Decent Work and Economic Growth | Google® Search |
| Travel and Expense Management | Finance | Google® Search |
| Customer Service, Contact, and Call Center Software Solutions | Google® Search |
| Create custom iOS app with SDK Assistant | Developer tutorial | Google® Search |
| HR Document Management | HCM Software | Google® Search |
| 2010 Annual RepoRt FoRm 20-F | Google® Search |

Status: New  Priority: Medium  Processor:  Reported On:  Requestor:  Company:
[Save] [Close] [Take Over]—202a
General  [Search] Solution Search  Incident Context  Changes  Attachments Solution Collection

Solution Search
If you enter keywords in a language other than English and you receive
too few hits, you can repeat your search using English keywords to  ←203
increase the chance of receiving a larger number of hits.     [Buyer responsible m ⊗ ↻] [▽]

Search Criteria
Max Hits: [ 20 ▦ ]  [▽+]—214
[Go 🔍] [↻ Reset]  [🗋 Save Query]  [⚙ Organize Queries]

| Repository Type | 206 | Correlation I... | ID | Title |
|---|---|---|---|---|
| ▽ Repository Type: Google® Search Results (10) | | | | |—208
| Google® Search Results | 100% | | | 1918591 - Error Message: "Buyer responsible missing" Occurs ... |
| Google® Search Results | 100% | | | Agreements |
| Google® Search Results | 100% | | | UN Global Goals |
| Google® Search Results | 100% | | | 1667840 - How to Create Purchase Order With Zero Price Li... |
| Google® Search Results | 100% | | | Travel and Expense Management | Finance |
| Google® Search Results | 100% | | | Community | Business ByDesign | Cloud Based ERP to... |
| Google® Search Results | 100% | | | HR Document Management | HCM Software |
| Google® Search Results | 100% | | | Analysis for Microsoft Office |
| Google® Search Results | 100% | | | Analyze the movieLens dataset | Developer tutorial |

300

New search engine
▼ Edit search engine
  [Mukesh ⇅]
    Setup
    Look and feel
    Search features
    Statistics and Logs
▼ Help
  Visit Help Forum
  (Ask a question)
  Send Feedback

| Basics | Ads | Admin | Advanced |

Provide basic details and preferences for your search engine. Learn more

Search engine name — 302
[Mukesh]

Search engine description
[Description of search engine]

Search engine keywords (?)
[XYZ System ByDesign]

Edition
Free, with ads.

Details [Search engine ID] [Public URL] [Get code]

Image search (?)                           [   OFF ]

Language
[English ⇅]
                                          Advanced

Sites to search            [Search only included sites ⇅]

[Add] [Delete] [Filter] [Label ▼]   1-2 of 2 [<][>]

☐ Site                              Label
☐ www.example.com
☐ https://apps.support.example.com Advanced Submit indexing and removal requests via
Google Search Console. Learn more

SEARCH TECHNIQUES USING CONTEXT

PRIORITY CLAIM

This application claims priority under 35 USC § 119(e) to India Provisional Patent Application Serial No. 201811039473, filed on Oct. 18, 2018, the entire contents of which are hereby incorporated by reference.

BACKGROUND

When errors occur during the use of an application, conventional systems can display an error message to a user of the application. The error message can indicate a reason for the error, such as an error in a value entered by the user or a missing value (needing entry by the user). Some conventional systems can also display help topics or make help available in another way. If the user is unable to find a solution based on the conventional information that is available, the user can open a new window and perform a search. The user may enter the name of the error or an error number, for example, as search criteria for performing the search.

SUMMARY

The present disclosure describes techniques for providing solutions to a problem. In an implementation, a computer-implemented method comprises: receiving a request to perform a search for solutions corresponding to a topic, the request including the topic and a context associated with the topic for which solutions are to be searched, the context associated with a current state of an application in use by a user; performing the search using the context and the topic; and providing results of the search for presentation to the user, the results presented in an application of the application without requiring the user to exit the application.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the user does not need to exit an application in order to receive search results for solutions associated with a problem that occurs while using the application. Second, third-party search engines (for example, Google) can be used to perform a search using the features of a robust search engine. Third, the time needed to resolve a problem can be reduced. Fourth, less time can be needed by a customer's in-house information technology (IT) contact (or a "key user") to resolve a problem.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 1 is a screen shot of an example of an application page on which errors have occurred, according to an implementation of the present disclosure.

FIG. 2A is a screen shot of an example of a solution search page for searching for solutions to errors, according to an implementation of the present disclosure.

FIG. 2B is a screen shot of another example of the solution search page of FIG. 2A, according to an implementation of the present disclosure.

FIG. 3 is a screen shot of an example of a solution engine configuration page, according to an implementation of the present disclosure.

FIG. 5A is a screen shot of an example of an application programming interface (API) keys entry screen for enabling the solution search functionality, according to an implementation of the present disclosure.

Like reference numbers and designations in the various drawings indicate like elements.

DETAILED DESCRIPTION

Figure 4A:
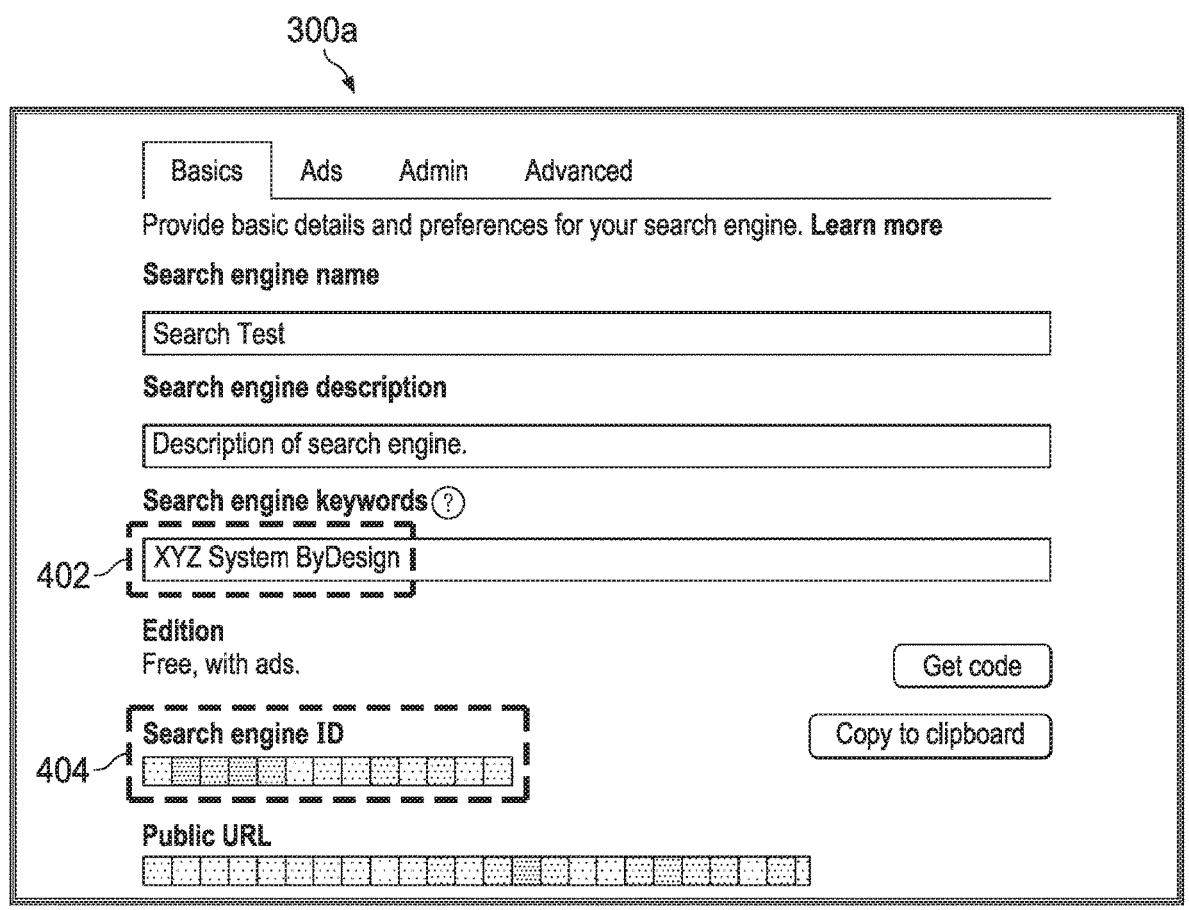
FIG. 4A is a screen shot of an example page section of the solution engine configuration page of FIG. 3, according to an implementation of the present disclosure.

The following detailed description describes techniques for providing solutions to problems, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

In some implementations, a search engine (for example, interfaced with Google) can be integrated with an application in order to perform searches for solutions to problems. The searches can be applied to a pre-determined set of web pages as well as internal resources such as a learning center, knowledge base articles, and a community forum.

Figure 1A:
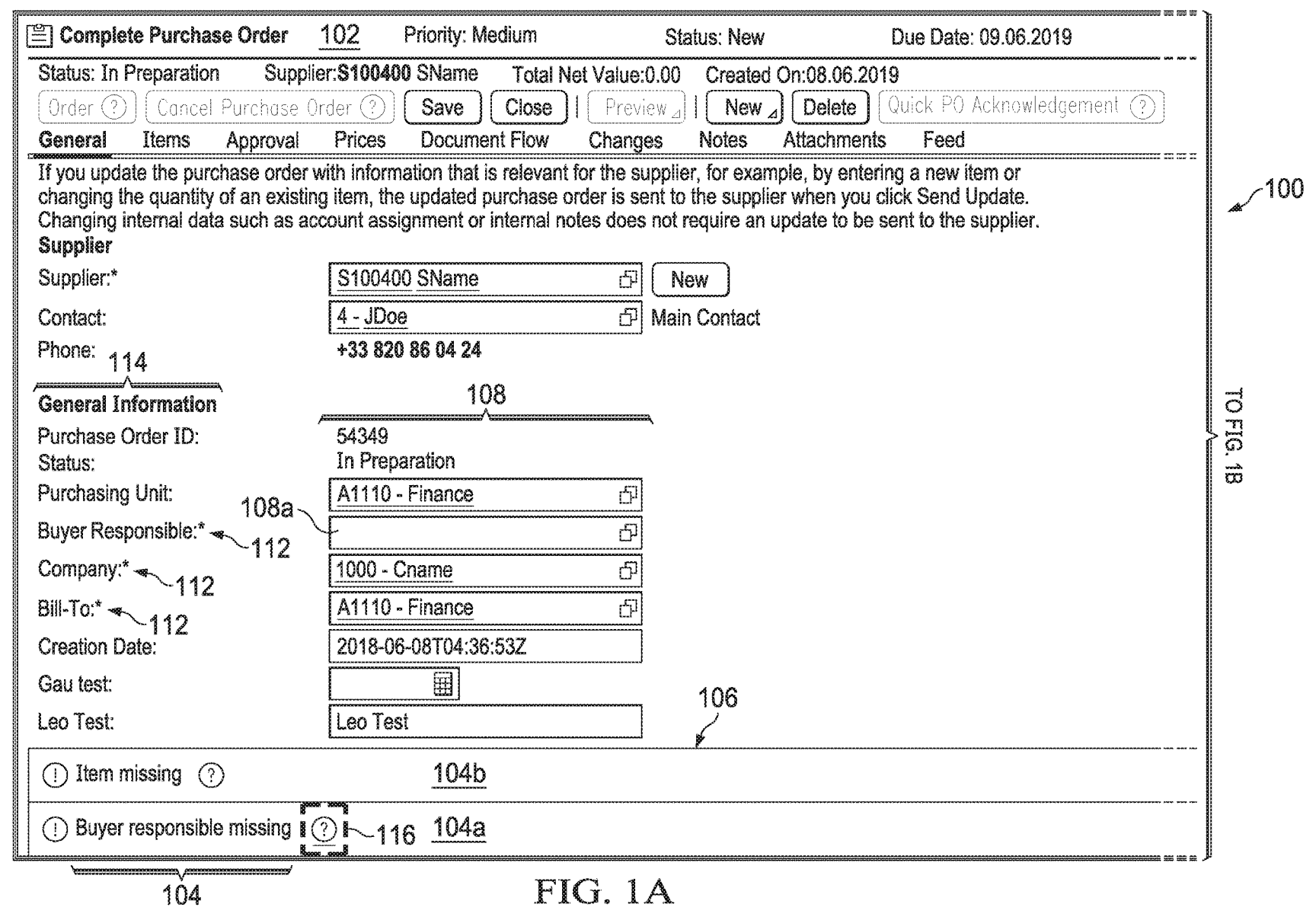
Figure 1B:
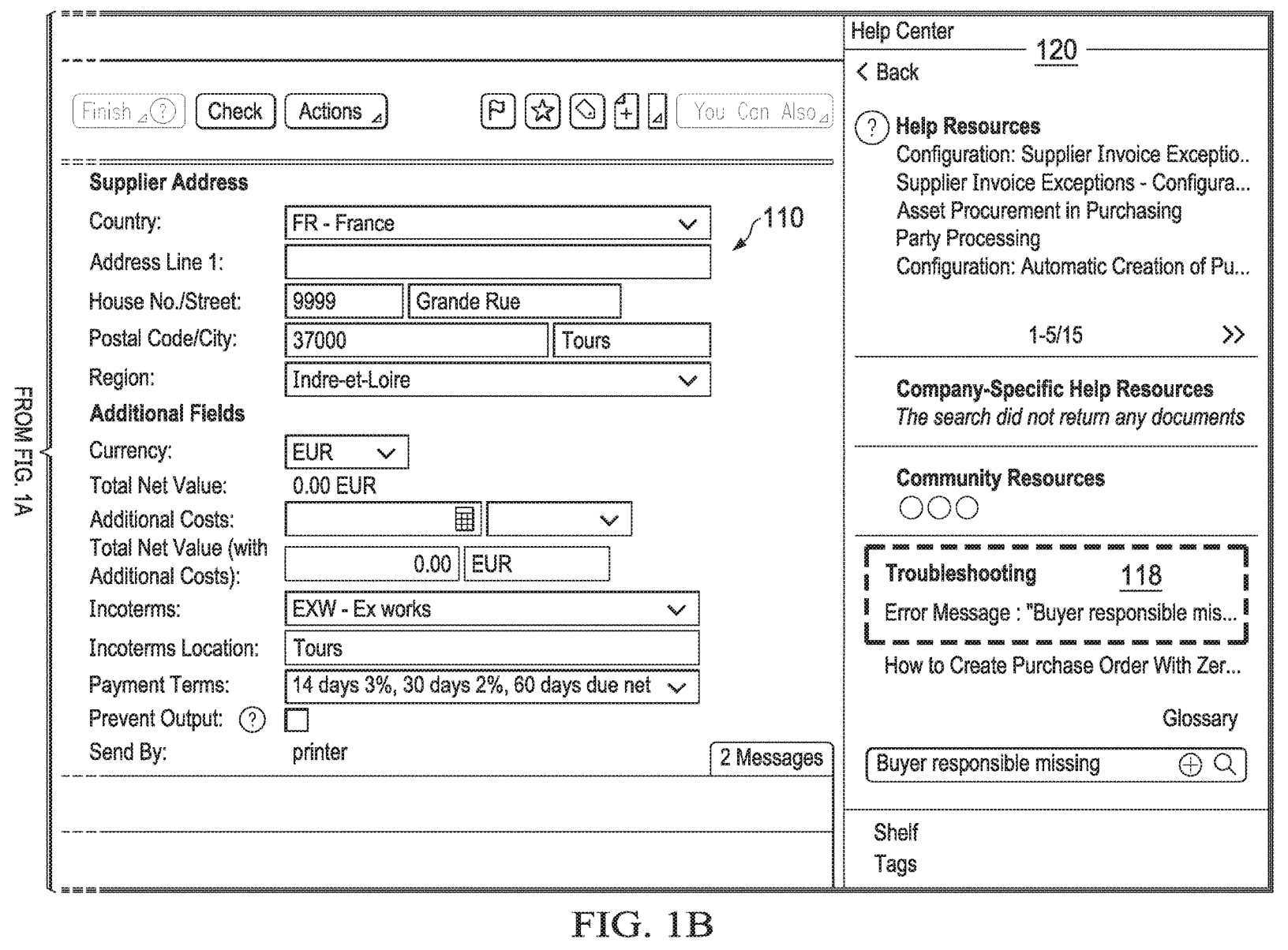

FIG. 1 is a screen shot of an example of an application page 100 on which errors have occurred, according to an implementation of the present disclosure. For example, the application page 100 can be a "Complete Purchase Order" screen 102 that can be used by a user to input and display information about a purchase order that is being completed. The errors that may occur and be displayed in this example can apply to missing or incorrect information, such as a missing entry for a buyer responsible field 108a.

Error messages 104 (for example, "Item missing" and "Buyer responsible missing") are displayed in an error message area 106. The error messages 104 correspond to errors that have occurred relative to fields 108 in a purchase order information area 110. A "Buyer responsible missing" error message 104a corresponds to the buyer responsible field 108a, which is currently blank. The buyer responsible field 108a may be blank, for example, if the user has yet to enter a value for the buyer responsible in the buyer responsible field 108a, or if navigation to the "Complete Purchase Order" screen 102 has occurred without that value being previously provided.

An "Item missing" error message 104b can also correspond to the buyer responsible field 108a or to another field 108 for which input is needed. The "Item missing" error message 104b can be a more generic error message that applies to one or multiple errors. Error flags 112 (for example, asterisks) next to a field name 114 can indicate that one or more error message 104 relative to the fields exist in the error message area 106.

To obtain information to resolve a particular error, the user can select (for example, click on) a hyperlink 116 or select a troubleshooting topic 118 from a help panel 120. In some implementations, the help panel 120 can be displayed upon a determination, by the application, that an error exists.

FIG. 2A is a screen shot of an example of a solution search page 200 for searching for solutions to errors, according to an implementation of the present disclosure. The solution search page 200 can be displayed to the user, for example, upon user selection of the hyperlink 116 or after selection of the troubleshooting topic 118 from the help panel 120. In another example, the solution search page 200 can be the initial page that is presented to the user when the user decides to open an incident related to an error. For example, the solution search page 200 can be displayed when a search for solution tab 202a is selected or becomes active among tabs 202 that can provide a progression of screens that can culminate in completing an incident report. In the current example, an incident report may result that is associated with the "Buyer responsible missing" error message 104a and the corresponding error. As such, the solution search page 200 identifies the error "Buyer responsible missing" in an error topic box 203. The solution search page 200 can be a search results page of the application to which the user is automatically navigated or to which the user navigates by choice.

The solution search page 200 can allow the user to search for a solution on his own. If the user finds a solution, for example, the additional tabs 202 may not be used by the user to complete the incident report, as the solution found by the user may satisfy the user's needs, enabling the user to avoid writing the incident report. For example, the user might only use tabs 202b, 202c, and 202d if no solution is found.

A solutions type selection control 204 can allow the user to select the types of solutions for which searching for solutions is to occur. For example, the user can select "All Solutions" using the solutions type selection control 204, causing all solutions to be searched. The "All Solutions" option can indicate, for example, that all repository types 206 are to be searched. Repository types 206 can include, for example, built-in help repositories 206a, search engine repositories 206b (for example, used by Google or some other search engine), community resources (for example, blog posts and articles), and knowledge-based articles. As an example, knowledge-based articles can include short documents that have been written to resolve a particular problem or issue. A current selection of the solutions type selection control 204 can control which solutions 208, including solutions corresponding to the error topic in the error topic box 203, are displayed.

A group by control 210 can provide the user with mechanism to sort output of solutions 208 that are the result of the search. For example, if the current selection of the group by control 210 is "Repository Type," then the solutions 208 that are displayed are grouped by the corresponding repository type 206. In this example, names of the corresponding repositories are displayed with a count 212 indicating the number of solutions 208 found from that repository type 206.

Entries in the solutions 208 can appear in an order that is determined in various ways. For example, the solutions 208 can be include a solution 208a as a top entry (for example, displayed first) if a title of the solution 208a includes an exact match to terms (for example, "Buyer responsible missing") of the error topic in the error topic box 203. Other entries in the solutions 208 can be selected (and ordered) based on, for example, one or more of a degree of matching, a timeliness of a topic, or a popularity of a topic. The order of the solutions 208 can be based, at least in part, on page rank algorithms used by search engines. Ranks of the solutions 208 and the degrees of matching can be based on matches between terms in the error topic (in the error topic box 203) and title terms or document content of the solutions 208. The solutions 208 that are displayed can also depend on a context, for example, a context of "purchase orders" that is related to the "Complete Purchase Order" screen 102.

FIG. 2B is a screen shot of another example of the solution search page 200 of FIG. 2A, according to an implementation of the present disclosure. In this example, additional controls are provided to the user by which the user can control the operation of solution searches and understand how solutions are chosen. The solution search page 200 can be reached, for example, through a navigation sequence such as (Application and User Management Incidents→Edit). Other navigation sequences can include, for example, (Help Center→Solve Problem) or other sequences that are used to report an incident. The solution search page 200 includes solutions that are determined using a search engine (for example, Google) search. Based on inputs provided by the user, including the error topic (in the error topic box 203) and current settings of search controls 214, a search can be triggered that includes a search engine search, using repositories specified by the user. Information that results from the search can supplement other knowledge bases and help repositories, including learning centers, user communities, and knowledge-based articles. Some or all of the knowledge bases and help repositories can be prepared (for example, crawled and indexed) for use by the search engine search.

FIG. 3 is a screen shot of an example of a solution engine configuration page 300, according to an implementation of the present disclosure. Users (for example, programmers) can use the solution engine configuration page 300 to set up conditions and parameters that solution searches will use to search for and identify proposed solutions. For example, the user can use the solution engine configuration page 300 to define how application programming interfaces (APIs) are to be used for performing solution searches.

The solution engine configuration page 300 can be used with custom search JavaScript Object Notation (JSON) APIs. The APIs can be used with developed websites and applications to retrieve and display search results, including solutions such as the solutions 208, using search engine searches programmatically. Use of the APIs can provide search results based on representational state transfer (REST)ful requests to obtain either web search or image search results in JSON format. The solution engine configuration page 300 can be used to create a custom search engine for use by a company, for example, to search for solutions 208 corresponding to errors in applications such as the application page 100 that includes the "Complete Purchase Order" screen 102. The solution engine configuration page 300 can include a search engine name field 302 by which the user can provide a search engine name associated with the custom search engine.

FIG. 4A is a screen shot of an example page section 300a of the solution engine configuration page 300 of FIG. 3, according to an implementation of the present disclosure. The page section 300a includes a search engine keywords field 402 in which the user can enter keywords (for example, "XYZ System ByDesign") that can provide a context for solution searches. The context can be used to fine-tune the search results. For example, when a search occurs for "Buyer Responsible Missing", the search engine knows to search in context of "XYZ System ByDesign." A search engine identification (ID) field 404 can identify the search engine that is to be used for solution searches.

Figure 4B:
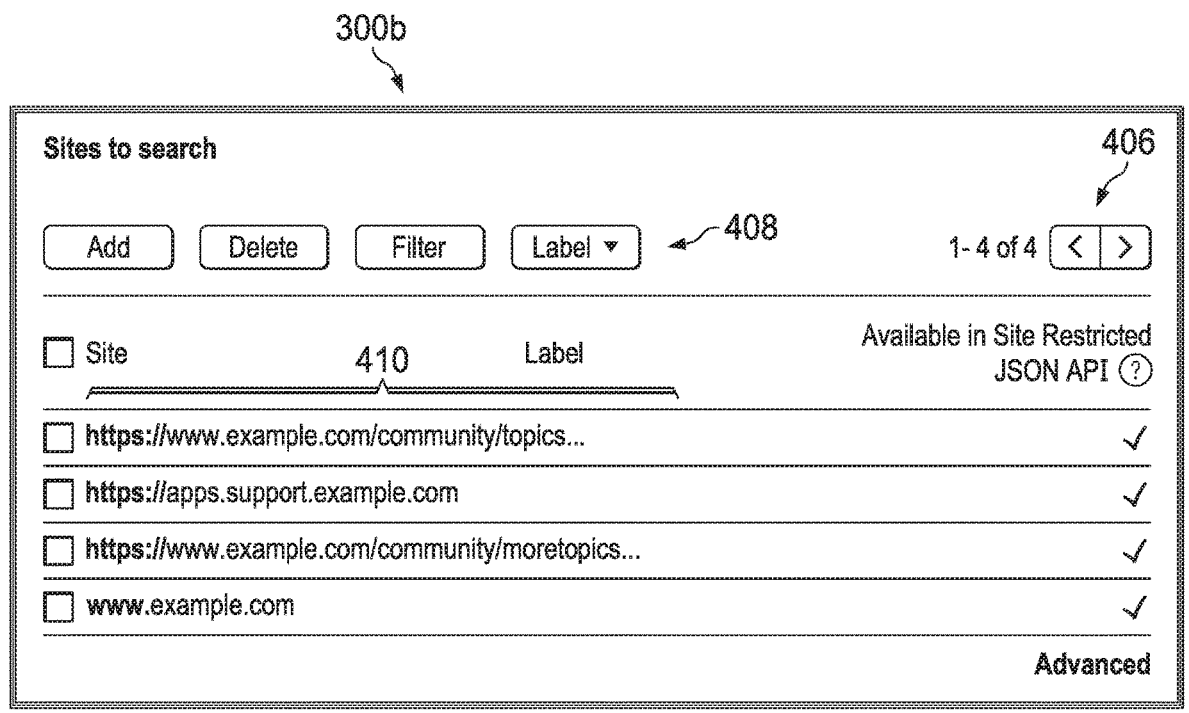
FIG. 4B is a screen shot of an example page section of the solution engine configuration page of FIG. 3, according to an implementation of the present disclosure.

FIG. 4B is a screen shot of an example page section 300b of the solution engine configuration page 300 of FIG. 3, according to an implementation of the present disclosure. The page section 300b includes a sites-to-search definition area 406 that the user can use to identify web sites that are to be used for solution searched. The user can use controls 408 to add, delete, filter, and label individual web pages 410 that are to be used in searching. The web pages 410 can include corporate web sites, community web sites, and public websites, for example. The web pages 410 can include can be defined by inputs provided by an administrator to define a pre-configured list of search locations (or repositories and web pages). In some implementations, additional controls can be used to allow the user to specify types of web pages to search, such as by topic or keyword.

Figure 4C:
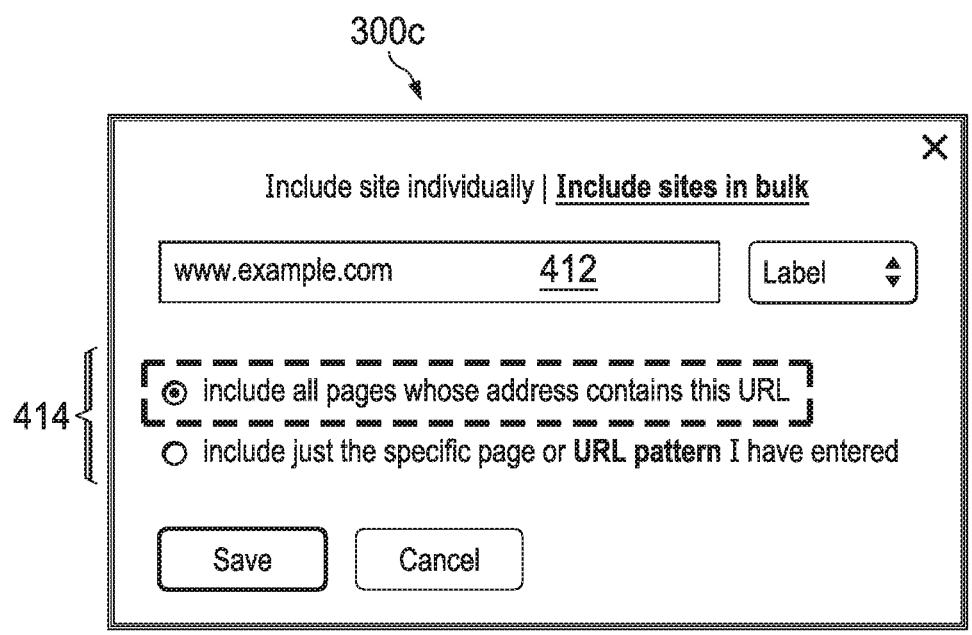
FIG. 4C is a screen shot of an example page section of the solution engine configuration page of FIG. 3, according to an implementation of the present disclosure.

FIG. 4C is a screen shot of an example page section 300c of the solution engine configuration page 300 of FIG. 3, according to an implementation of the present disclosure. For a given web site 412, for example, the user can use controls 414 to specify whether to use all sites sharing the uniform resource locator (URL) (for example, including sub-pages), or just to include a specific URL entered by the user.

Figure 5A:
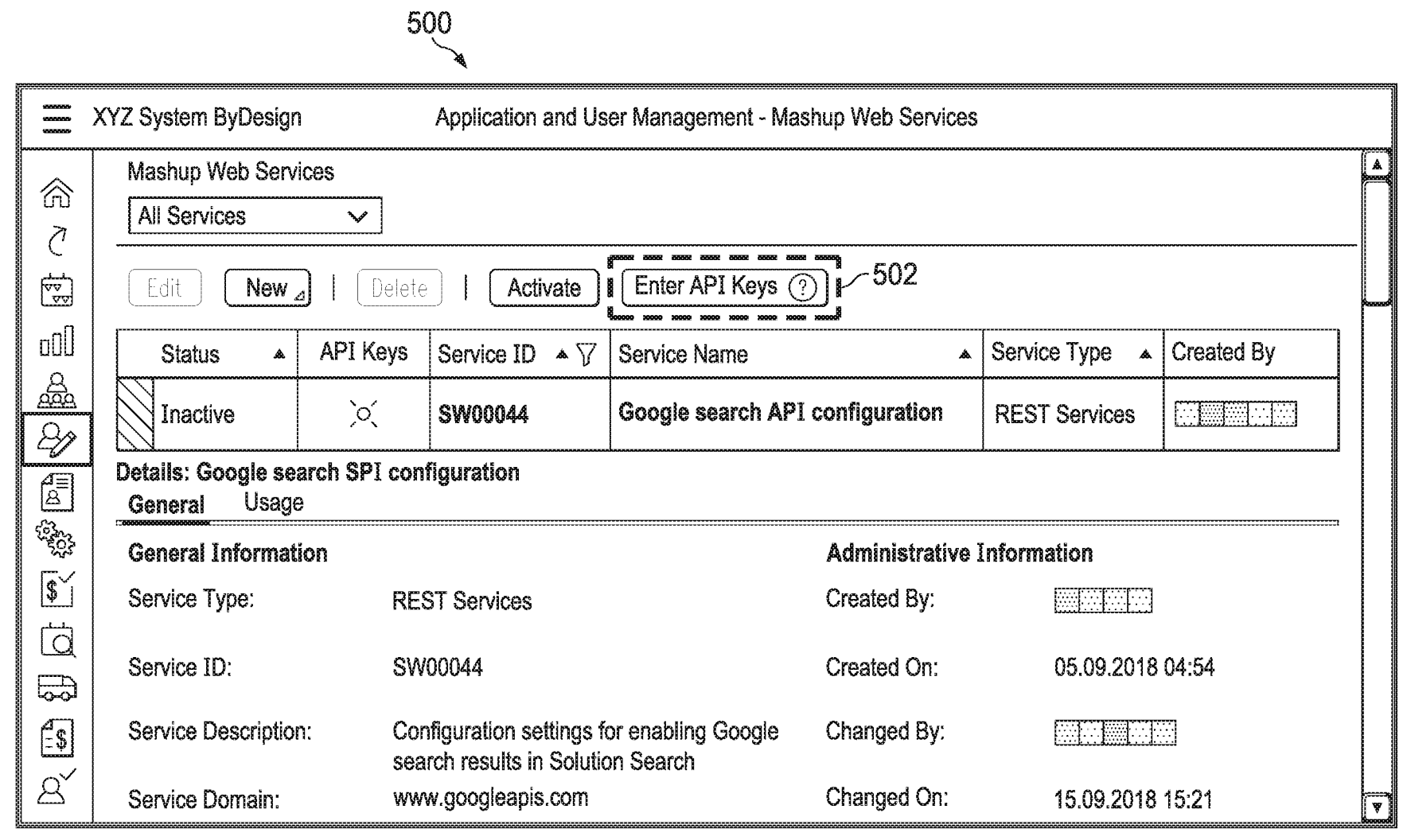

FIG. 5A is a screen shot of an example of an API keys entry screen 500 for enabling the solution search functionality, according to an implementation of the present disclosure. The user can use an Enter API Keys control 502, for example, to enter API keys that enable API interfaces with the solution search to function. Entry of the API keys can occur, for example, after the user has performed an action to request a key, such as by searching for a term "GET A KEY" on a webpage and selecting a project to be enabled. The API key can be maintained, for example, by following an options/actions path such as (WoC "Application and User Management"→Business Flexibility→Mash up Web Services).

Figure 5B:
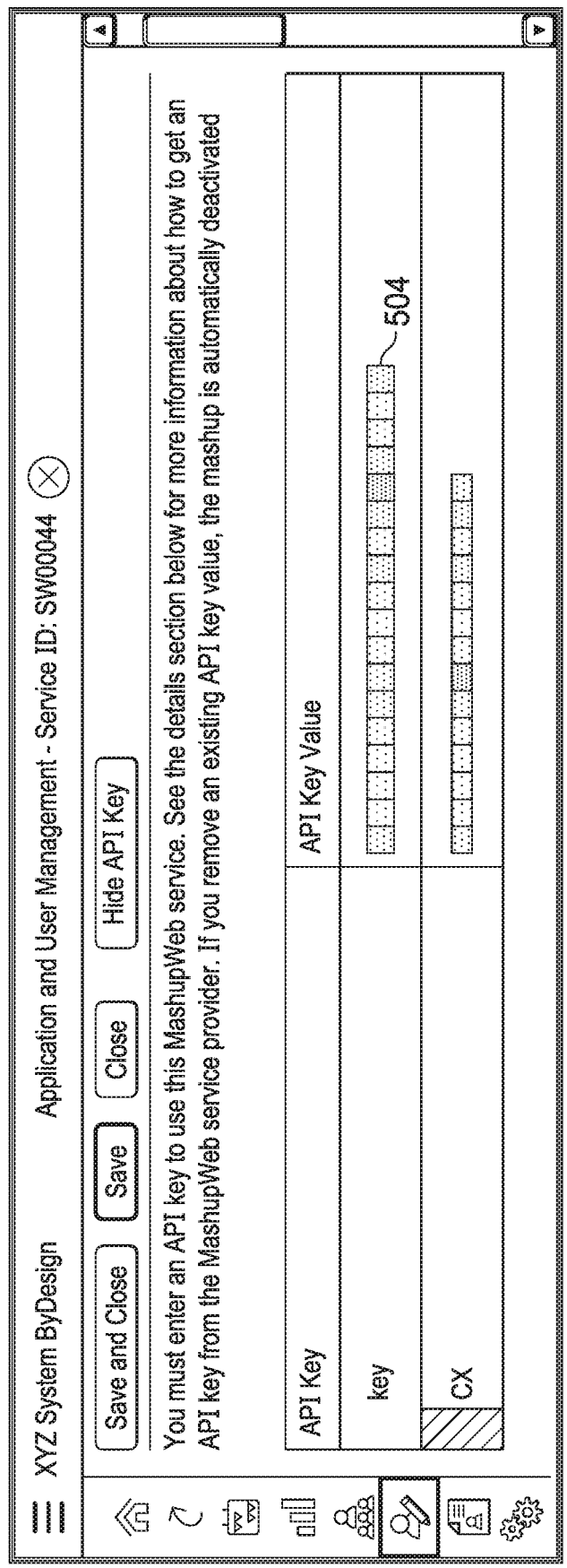
FIG. 5B is a screen shot of an example of an API keys entry screen for displaying and maintaining an API key, according to an implementation of the present disclosure.

FIG. 5B is a screen shot of an example of an API keys entry screen for displaying and maintaining an API key, according to an implementation of the present disclosure. For example, the API key can be displayed in a field 504. Another field can be used to maintain an engine ID. The combination of the API key and the engine ID can be used, for example, to enable activation of the search solution.

Figure 6:
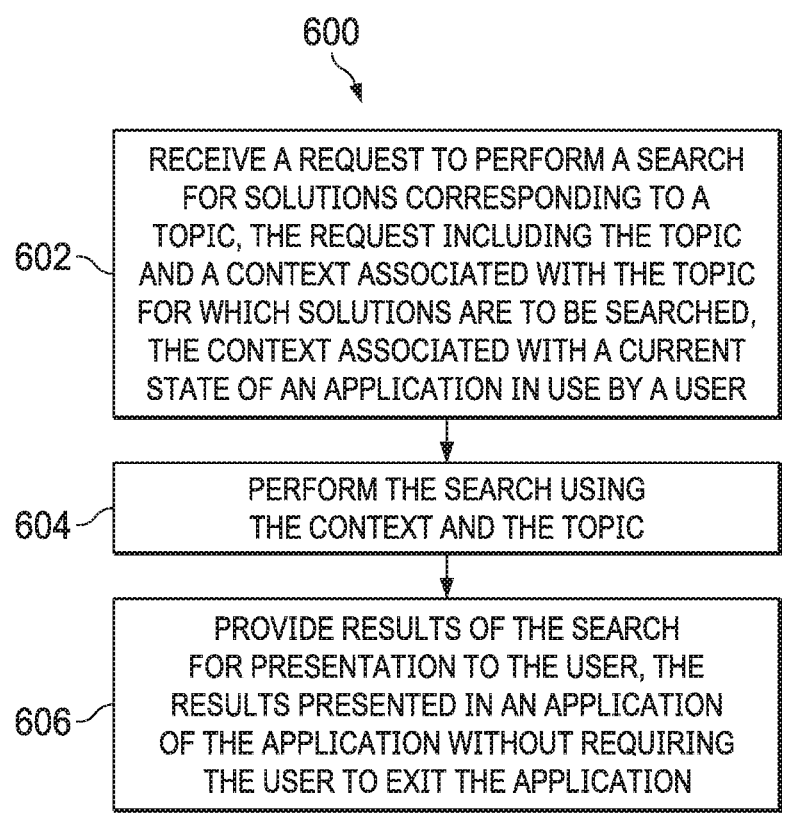
FIG. 6 is a flowchart illustrating an example of a computer-implemented method for providing solutions for a problem, according to an implementation of the present disclosure.

FIG. 6 is a flowchart illustrating an example of a computer-implemented method 600 for providing solutions for a problem, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a request is received to perform a search for solutions corresponding to a topic. The request includes the topic and a context associated with the topic for which solutions are to be searched. The context is associated with a current state of an application in use by a user. For example, a search request can occur automatically when the user receives the "Buyer responsible missing" error message 104a corresponding to the buyer responsible field 108a and the user selects the hyperlink 116 or selects the troubleshooting topic 118 from the help panel 120. From 602, method 600 proceeds to 604.

At 604, the search is performed using the context and the topic. As an example, the search can be applied to repositories that include the web pages 410. In some implementations, performing the search can include using a third-party search engine (for example, Google) to complete the search using a pre-configured list of search locations to perform the search (for example, the web pages 410 and other pre-determined repositories). Performing the search can include searching the web pages and internal resources including a learning center, knowledge base articles, and community resources. From 604, method 600 proceeds to 606.

At 606, results of the search are provided for presentation to the user. The results are presented in an application of the application without requiring the user to exit the application. For example, the solution search page 200 can be displayed to the user. The solution search page 200 can include the solutions 208 that are grouped by the corresponding repository type 206. In this example, the solutions 208 can include search results that correspond to the search engine repository 206b (for example, Google or some other search engine). After 606, method 600 stops.

Figure 7:
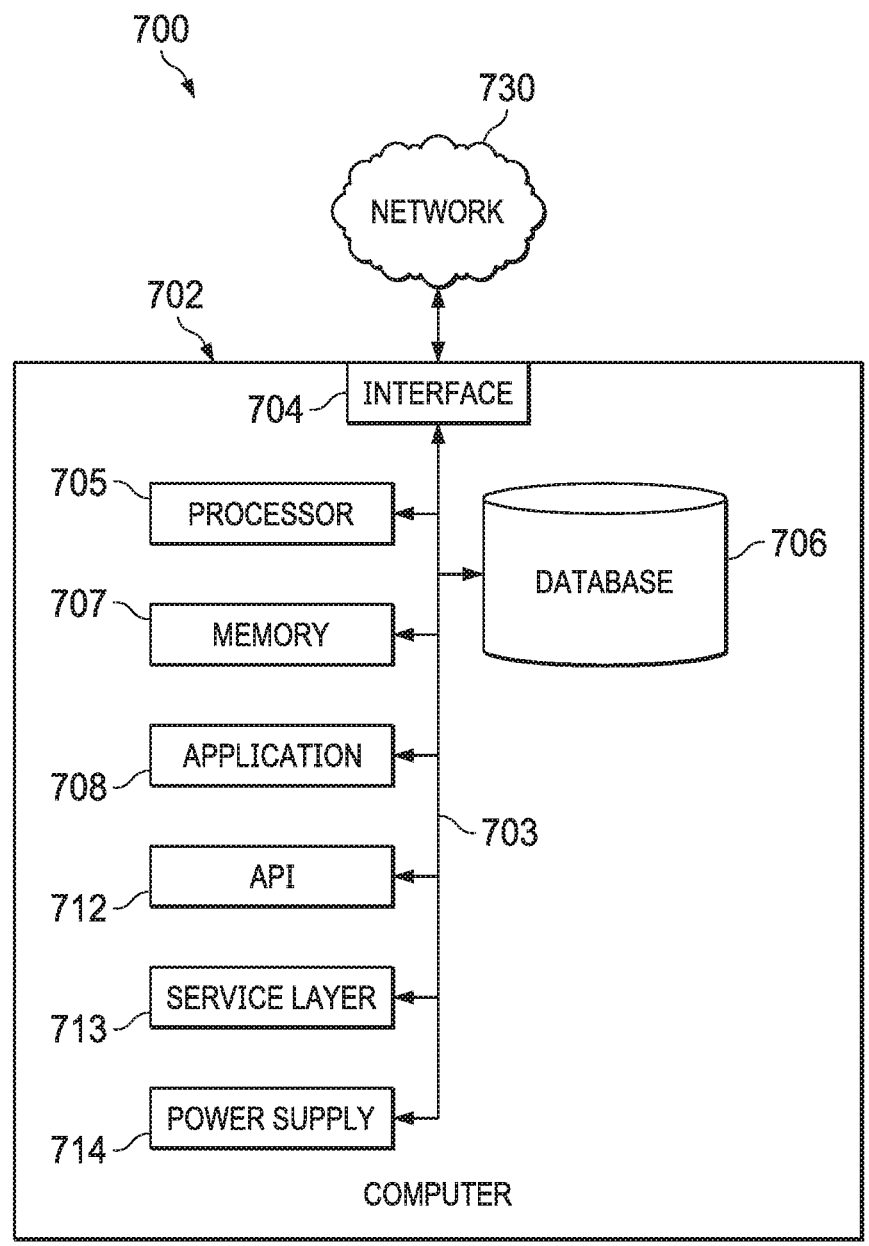
FIG. 7 is a block diagram illustrating an example of a computer-implemented system used to provide computational functionalities associated with described algorithms, methods, functions, processes, flows, and procedures, according to an implementation of the present disclosure.

FIG. 7 is a block diagram illustrating an example of a computer-implemented System 700 used to provide computational functionalities associated with described algorithms, methods, functions, processes, flows, and procedures, according to an implementation of the present disclosure. In the illustrated implementation, System 700 includes a Computer 702 and a Network 730.

The illustrated Computer 702 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 702 can include an input device, such as a keypad, keyboard, or touch screen, or a combination of input devices that can accept user information, and an output device that conveys information associated with the operation of the Computer 702, including digital data, visual, audio, another type of information, or a combination of types of information, on a graphical-type user interface (UI) (or GUI) or other UI.

The Computer 702 can serve in a role in a distributed computing system as, for example, a client, network component, a server, or a database or another persistency, or a combination of roles for performing the subject matter described in the present disclosure. The illustrated Computer 702 is communicably coupled with a Network 730. In some implementations, one or more components of the Computer 702 can be configured to operate within an environment, or a combination of environments, including cloud-computing, local, or global.

At a high level, the Computer 702 is an electronic computing device operable to receive, transmit, process, store, or manage data and information associated with the described subject matter. According to some implementations, the Computer 702 can also include or be communicably coupled with a server, such as an application server, e-mail server, web server, caching server, or streaming data server, or a combination of servers.

The Computer 702 can receive requests over Network 730 (for example, from a client software application executing on another Computer 702) and respond to the received requests by processing the received requests using a software application or a combination of software applications. In addition, requests can also be sent to the Computer 702 from internal users (for example, from a command console or by another internal access method), external or third-parties, or other entities, individuals, systems, or computers.

Each of the components of the Computer 702 can communicate using a System Bus 703. In some implementations, any or all of the components of the Computer 702, including hardware, software, or a combination of hardware and software, can interface over the System Bus 703 using an application programming interface (API) 712, a Service Layer 713, or a combination of the API 712 and Service Layer 713. The API 712 can include specifications for routines, data structures, and object classes. The API 712 can be either computer-language independent or dependent and refer to a complete interface, a single function, or even a set of APIs. The Service Layer 713 provides software services to the Computer 702 or other components (whether illustrated or not) that are communicably coupled to the Computer 702. The functionality of the Computer 702 can be accessible for all service consumers using the Service Layer 713. Software services, such as those provided by the Service Layer 713, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 702, alternative implementations can illustrate the API 712 or the Service Layer 713 as stand-alone components in relation to other components of the Computer 702 or other components (whether illustrated or not) that are communicably coupled to the Computer 702. Moreover, any or all parts of the API 712 or the Service Layer 713 can be implemented as a child or a sub-module of another software module, enterprise application, or hardware module without departing from the scope of the present disclosure.

The Computer 702 includes an Interface 704. Although illustrated as a single Interface 704, two or more Interfaces 704 can be used according to particular needs, desires, or particular implementations of the Computer 702. The Interface 704 is used by the Computer 702 for communicating with another computing system (whether illustrated or not) that is communicatively linked to the Network 730 in a distributed environment. Generally, the Interface 704 is operable to communicate with the Network 730 and includes logic encoded in software, hardware, or a combination of software and hardware. More specifically, the Interface 704 can include software supporting one or more communication protocols associated with communications such that the Network 730 or hardware of Interface 704 is operable to communicate physical signals within and outside of the illustrated Computer 702.

The Computer 702 includes a Processor 705. Although illustrated as a single Processor 705, two or more Processors 705 can be used according to particular needs, desires, or particular implementations of the Computer 702. Generally, the Processor 705 executes instructions and manipulates data to perform the operations of the Computer 702 and any algorithms, methods, functions, processes, flows, and procedures as described in the present disclosure.

The Computer 702 also includes a Database 706 that can hold data for the Computer 702, another component communicatively linked to the Network 730 (whether illustrated or not), or a combination of the Computer 702 and another component. For example, Database 706 can be an in-memory or conventional database storing data consistent with the present disclosure. In some implementations, Database 706 can be a combination of two or more different database types (for example, a hybrid in-memory and conventional database) according to particular needs, desires, or particular implementations of the Computer 702 and the described functionality. Although illustrated as a single Database 706, two or more databases of similar or differing types can be used according to particular needs, desires, or particular implementations of the Computer 702 and the described functionality. While Database 706 is illustrated as an integral component of the Computer 702, in alternative implementations, Database 706 can be external to the Computer 702.

The Computer 702 also includes a Memory 707 that can hold data for the Computer 702, another component or components communicatively linked to the Network 730 (whether illustrated or not), or a combination of the Computer 702 and another component. Memory 707 can store any data consistent with the present disclosure. In some implementations, Memory 707 can be a combination of two or more different types of memory (for example, a combination of semiconductor and magnetic storage) according to particular needs, desires, or particular implementations of the Computer 702 and the described functionality. Although illustrated as a single Memory 707, two or more Memories 707 or similar or differing types can be used according to particular needs, desires, or particular implementations of the Computer 702 and the described functionality. While Memory 707 is illustrated as an integral component of the Computer 702, in alternative implementations, Memory 707 can be external to the Computer 702.

The Application 708 is an algorithmic software engine providing functionality according to particular needs, desires, or particular implementations of the Computer 702, particularly with respect to functionality described in the present disclosure. For example, Application 708 can serve as one or more components, modules, or applications. Further, although illustrated as a single Application 708, the Application 708 can be implemented as multiple Applications 708 on the Computer 702. In addition, although illustrated as integral to the Computer 702, in alternative implementations, the Application 708 can be external to the Computer 702.

The Computer 702 can also include a Power Supply 714. The Power Supply 714 can include a rechargeable or non-rechargeable battery that can be configured to be either user- or non-user-replaceable. In some implementations, the Power Supply 714 can include power-conversion or management circuits (including recharging, standby, or another power management functionality). In some implementations, the Power Supply 714 can include a power plug to allow the Computer 702 to be plugged into a wall socket or another power source to, for example, power the Computer 702 or recharge a rechargeable battery.

There can be any number of Computers 702 associated with, or external to, a computer system containing Computer 702, each Computer 702 communicating over Network 730. Further, the term "client," "user," or other appropriate terminology can be used interchangeably, as appropriate, without departing from the scope of the present disclosure. Moreover, the present disclosure contemplates that many users can use one Computer 702, or that one user can use multiple computers 702.

Described implementations of the subject matter can include one or more features, alone or in combination.

For example, in a first implementation, a computer-implemented method comprises: receiving a request to perform a search for solutions corresponding to a topic, the request including the topic and a context associated with the topic for which solutions are to be searched, the context associated with a current state of an application in use by a user; performing the search using the context and the topic; and providing results of the search for presentation to the user, the results presented in an application of the application without requiring the user to exit the application.

The foregoing and other described implementations can each, optionally, include one or more of the following features:

A first feature, combinable with any of the following features, wherein performing the search includes using a third-party search engine to complete the search, the third-party search engine using a pre-configured list of search locations to perform the search.

A second feature, combinable with any of the previous or following features, further comprising receiving, from inputs provided by an administrator, the pre-configured list of search locations.

A third feature, combinable with any of the previous or following features, wherein the pre-configured list of search locations identifies web pages to search and, for each web page, instructions specifying whether or not to search sub-pages of the web page.

A fourth feature, combinable with any of the previous or following features, wherein performing the search includes searching the web pages and internal resources including a learning center, knowledge base articles, and community resources.

A fifth feature, combinable with any of the previous or following features, wherein the topic is an error message encountered during execution of the application.

A sixth feature, combinable with any of the previous or following features, wherein performing the search includes navigating to a search results page of the application.

In a second implementation, a computer-readable medium stores one or more instructions executable by a computer system to perform operations comprising: receiving a request to perform a search for solutions corresponding to a topic, the request including the topic and a context associated with the topic for which solutions are to be searched, the context associated with a current state of an application in use by a user; performing the search using the context and the topic; and providing results of the search for presentation to the user, the results presented in an application of the application without requiring the user to exit the application.

The foregoing and other described implementations can each, optionally, include one or more of the following features:

A first feature, combinable with any of the following features, wherein performing the search includes using a third-party search engine to complete the search, the third-party search engine using a pre-configured list of search locations to perform the search.

A second feature, combinable with any of the previous or following features, the operations further comprising receiving, from inputs provided by an administrator, the pre-configured list of search locations.

A third feature, combinable with any of the previous or following features, wherein the pre-configured list of search locations identifies web pages to search and, for each web page, instructions specifying whether or not to search sub-pages of the web page.

A fourth feature, combinable with any of the previous or following features, wherein performing the search includes searching the web pages and internal resources including a learning center, knowledge base articles, and community resources.

A fifth feature, combinable with any of the previous or following features, wherein the topic is an error message encountered during execution of the application.

A sixth feature, combinable with any of the previous or following features, wherein performing the search includes navigating to a search results page of the application.

In a third implementation, a computer-implemented system comprises: one or more computers; and one or more computer memory devices interoperably coupled with the one or more computers and having tangible, non-transitory, machine-readable media storing one or more instructions that, when executed by the one or more computers, perform one or more operations comprising: receiving a request to perform a search for solutions corresponding to a topic, the request including the topic and a context associated with the topic for which solutions are to be searched, the context associated with a current state of an application in use by a user; performing the search using the context and the topic; and providing results of the search for presentation to the user, the results presented in an application of the application without requiring the user to exit the application.

The foregoing and other described implementations can each, optionally, include one or more of the following features:

A first feature, combinable with any of the following features, wherein performing the search includes using a third-party search engine to complete the search, the third-party search engine using a pre-configured list of search locations to perform the search.

A second feature, combinable with any of the previous or following features, the operations further comprising receiving, from inputs provided by an administrator, the pre-configured list of search locations.

A third feature, combinable with any of the previous or following features, wherein the pre-configured list of search locations identifies web pages to search and, for each web page, instructions specifying whether or not to search sub-pages of the web page.

A fourth feature, combinable with any of the previous or following features, wherein performing the search includes searching the web pages and internal resources including a learning center, knowledge base articles, and community resources.

A fifth feature, combinable with any of the previous or following features, wherein the topic is an error message encountered during execution of the application.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
providing, in response to user interaction with an application, an error message indicating an error encountered within the application;
receiving a request to perform a search for solutions corresponding to a topic, the request provided in response to user selection of the error message and including the topic and a context associated with the topic for which solutions are to be searched, the context associated with a current state of the application in use by a user;
performing the search by providing the context and the topic in a search query to a custom search engine configured to search for errors in the application; and
providing results of the search for presentation to the user, the results presented in an application of the application without requiring the user to exit the application.

2. The computer-implemented method of claim 1, wherein performing the search includes using a third-party search engine to complete the search, the third-party search engine using a pre-configured list of search locations to perform the search.

3. The computer-implemented method of claim 2, further comprising receiving, from inputs provided by an administrator, the pre-configured list of search locations.

4. The computer-implemented method of claim 2, wherein the pre-configured list of search locations identifies web pages to search and, for each web page, instructions specifying whether or not to search sub-pages of the web page.

5. The computer-implemented method of claim 2, wherein performing the search includes searching the web pages and internal resources including a learning center, knowledge base articles, and community resources.

6. The computer-implemented method of claim 1, wherein the topic is the error message.

7. The computer-implemented method of claim 1, wherein performing the search includes navigating to a search results page of the application.

8. A non-transitory, computer-readable medium storing one or more instructions executable by a computer system to perform operations comprising:
providing, in response to user interaction with an application, an error message indicating an error encountered within the application;
receiving a request to perform a search for solutions corresponding to a topic, the request provided in response to user selection of the error message and including the topic and a context associated with the topic for which solutions are to be searched, the context associated with a current state of the application in use by a user;
performing the search by providing the context and the topic in a search query to a custom search engine configured to search for errors in the application; and
providing results of the search for presentation to the user, the results presented in an application of the application without requiring the user to exit the application.

9. The non-transitory, computer-readable medium of claim 8, wherein performing the search includes using a third-party search engine to complete the search, the third-party search engine using a pre-configured list of search locations to perform the search.

10. The non-transitory, computer-readable medium of claim 9, the operations further comprising receiving, from inputs provided by an administrator, the pre-configured list of search locations.

11. The non-transitory, computer-readable medium of claim 9, wherein the pre-configured list of search locations identifies web pages to search and, for each web page, instructions specifying whether or not to search sub-pages of the web page.

12. The non-transitory, computer-readable medium of claim 9, wherein performing the search includes searching the web pages and internal resources including a learning center, knowledge base articles, and community resources.

13. The non-transitory, computer-readable medium of claim 8, wherein the topic is the error message.

14. The non-transitory, computer-readable medium of claim 8, wherein performing the search includes navigating to a search results page of the application.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
providing, in response to user interaction with an application, an error message indicating an error encountered within the application;
receiving a request to perform a search for solutions corresponding to a topic, the request provided in response to user selection of the error message and including the topic and a context associated with the topic for which solutions are to be searched, the context associated with a current state of the application in use by a user;
performing the search by providing the context and the topic in a search query to a custom search engine configured to search for errors in the application; and
providing results of the search for presentation to the user, the results presented in an application of the application without requiring the user to exit the application.

16. The computer-implemented system of claim 15, wherein performing the search includes using a third-party search engine to complete the search, the third-party search engine using a pre-configured list of search locations to perform the search.

17. The computer-implemented system of claim 16, the operations further comprising receiving, from inputs provided by an administrator, the pre-configured list of search locations.

18. The computer-implemented system of claim 16, wherein the pre-configured list of search locations identifies web pages to search and, for each web page, instructions specifying whether or not to search sub-pages of the web page.

19. The computer-implemented system of claim 16, wherein performing the search includes searching the web pages and internal resources including a learning center, knowledge base articles, and community resources.

20. The computer-implemented system of claim 15, wherein the topic is the error message.

* * * * *